(12) United States Patent
Wang et al.

(10) Patent No.: US 12,057,906 B2
(45) Date of Patent: Aug. 6, 2024

(54) DOWNLINK BEAMFORMING IN MU-MIMO SYSTEM

(71) Applicant: NOKIA SOLUTIONS AND NETWORKS OY, Espoo (FI)

(72) Inventors: Lijun Wang, Zhejiang (CN); Weiqiang Mao, Zhejiang (CN); Zhijun Liao, Zhejiang (CN); Youbao Luo, Sichuan (CN); Stefan Wesemann, Kornwestheim (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 6 days.

(21) Appl. No.: 17/786,083

(22) PCT Filed: Jan. 14, 2020

(86) PCT No.: PCT/CN2020/072066
§ 371 (c)(1),
(2) Date: Jun. 16, 2022

(87) PCT Pub. No.: WO2021/142629
PCT Pub. Date: Jul. 22, 2021

(65) Prior Publication Data
US 2023/0033028 A1 Feb. 2, 2023

(51) Int. Cl.
*H04L 1/02* (2006.01)
*H04B 7/0452* (2017.01)
*H04B 7/06* (2006.01)

(52) U.S. Cl.
CPC ......... *H04B 7/0617* (2013.01); *H04B 7/0452* (2013.01); *H04B 7/0639* (2013.01)

(58) Field of Classification Search
CPC ...... H04B 7/042; H04B 7/0617; H04B 15/00; H04B 7/0639; H04B 7/0456; H04B 7/043;
(Continued)

(56) References Cited

U.S. PATENT DOCUMENTS

2009/0080560 A1* 3/2009 Na ............... H04B 7/0636
375/267
2009/0233557 A1 9/2009 Wang et al.
(Continued)

FOREIGN PATENT DOCUMENTS

CN 102833038 A 12/2012
WO 2010/081736 A1 7/2010
(Continued)

OTHER PUBLICATIONS

First Office Action dated May 7, 2023 corresponding to Chinese Patent Application No. 202080092922.3, with English summary thereof.

(Continued)

*Primary Examiner* — Khai Tran
(74) *Attorney, Agent, or Firm* — SQUIRE PATTON BOGGS (US) LLP

(57) ABSTRACT

According to embodiments of the present disclosure, downlink beamforming in MU-MIMO systems is proposed. Embodiments of the present disclosure take practical receivers into consideration, to further mitigate the interferences sensed by terminal devices. The beamforming scheme according to embodiments of the present disclosure has many advantages. For example, embodiments of the present disclosure tackle interferences from terminal device view, to mitigate the interferences which really affect the received signals of terminal devices. Embodiments of the present disclosure do not assume that terminal devices utilize Eigen receivers but consider more practical receivers used by the terminal devices to mitigate the interferences. Embodiments of the present disclosure have high flexibility, different interference cancelling methods can be used to replace the ZF method.

19 Claims, 14 Drawing Sheets

(58) Field of Classification Search
CPC ..... H04W 72/23; H04W 72/54; H04W 16/28; H04L 25/0204; H04L 25/0328; H04L 43/16

USPC ........................................ 375/267, 260, 162
See application file for complete search history.

(56) References Cited

U.S. PATENT DOCUMENTS

| | | | |
|---|---|---|---|
| 2011/0299379 A1 | 12/2011 | Sesia et al. | |
| 2014/0094164 A1 | 4/2014 | Hwang et al. | |
| 2015/0215009 A1 | 7/2015 | Jia et al. | |
| 2018/0041265 A1* | 2/2018 | Su | H04B 7/0634 |
| 2018/0092110 A1* | 3/2018 | Mallik | H04L 5/0096 |
| 2019/0245646 A1* | 8/2019 | Robert Safavi | H04L 27/3488 |
| 2021/0234580 A1* | 7/2021 | El-Keyi | H04L 25/0204 |
| 2021/0320693 A1* | 10/2021 | Stephenne | H04B 7/0617 |

FOREIGN PATENT DOCUMENTS

| | | |
|---|---|---|
| WO | 2012/123257 A2 | 9/2012 |
| WO | 2013/063750 A1 | 5/2013 |
| WO | 2013064898 A1 | 5/2013 |

OTHER PUBLICATIONS

Extended European Search Report dated Aug. 23, 2023, corresponding to European Patent Application No. 20914543.2.
Chen Xuhong et al., " Low-Complexity Location-Aware Multi-User Massive MIMO Beamforming for High Speed Train Communications", 2017 IEEE 85th Vehicular Technology Conference (VTC Spring), IEEE, Jun. 4, 2017 (Jun. 4, 2017), pp. 1-6.
International Search Report and Written Opinion dated Oct. 15, 2020 corresponding to International Patent Application No. PCT/CN2020/072066.
Office Action dated Nov. 25, 2022, corresponding to Indian Patent Application No. 20224706242.
Chinese Office Action corresponding to CN Application No. 202080092922.3, dated Jan. 17, 2024.
Chinese Office Action corresponding to CN Application No. 202080092922.3, dated May 18, 2024.

* cited by examiner

Fig. 5

DOWNLINK BEAMFORMING IN MU-MIMO SYSTEM

FIELD

Embodiments of the present disclosure generally relate to communication techniques, and more particularly, to methods, devices and computer readable medium for downlink beamforming in multi-user Multiple-Input Multiple-Output (MU-MIMO) systems.

BACKGROUND

With development of communication technologies, MIMO has been proposed. The MIMO technology may achieve multiplying the capacity of a radio link by using multiple transmitting and receiving antennas to exploit multipath propagation. There are some factors that affect the performances of a MIMO system, for example, interferences. Thus, further studies on the MIMO technology are needed to improve system performance.

SUMMARY

Generally, embodiments of the present disclosure relate to a method for downlink beamforming in MU-MIMO systems and corresponding communication devices.

In a first aspect, there is provided a first device. The first device comprises at least one processor; and at least one memory including computer program codes; the at least one memory and the computer program codes are configured to, with the at least one processor, cause the first device to determine, at a first device, one or more beamforming vectors for one or more devices in a plurality of co-scheduled devices. The first device is also caused to iteratively update the one or more beamforming vectors by determining transmission properties of channels between the first device and the plurality of co-scheduled devices based on the one or more beamforming vectors and channel estimations of the channels; and performing precoding on the transmission properties of channels to mitigate interferences between the plurality of co-scheduled devices. The first device is further caused to perform beamforming for the plurality of co-scheduled devices based on the iteratively updated one or more beamforming vectors platoon.

In a second aspect, there is provided a method. The method comprises determining, at a first device, one or more beamforming vectors for one or more devices in a plurality of co-scheduled devices. The method also comprises iteratively updating the one or more beamforming vectors by determining transmission properties of channels between the first device and the plurality of co-scheduled devices based on the one or more beamforming vectors and channel estimations of the channels; and performing precoding on the transmission properties of channels to mitigate interferences between the plurality of co-scheduled devices. The method further comprises performing beamforming for the plurality of co-scheduled devices based on the iteratively updated one or more beamforming vectors.

In a third aspect, there is provided an apparatus. The apparatus comprises means for determining, at a first device, one or more beamforming vectors for at least one device in a plurality of co-scheduled devices; means for iteratively updating the one or more beamforming vectors by determining transmission properties of channels between the first device and the plurality of co-scheduled devices based on the one or more beamforming vectors and channel estimations of the channels; and performing precoding on the transmission properties of channels to mitigate interferences between the plurality of co-scheduled devices; and means for performing beamforming for the plurality of co-scheduled devices based on the iteratively updated one or more beamforming vectors.

In a fourth aspect, there is provided a computer readable medium comprising program instructions for causing an apparatus to perform at least the method according to the above second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 5 illustrates a schematic diagram of transceiver array according to embodiments of the present disclosure;

Throughout the drawings, the same or similar reference numerals represent the same or similar element.

DETAILED DESCRIPTION

Figure 1:
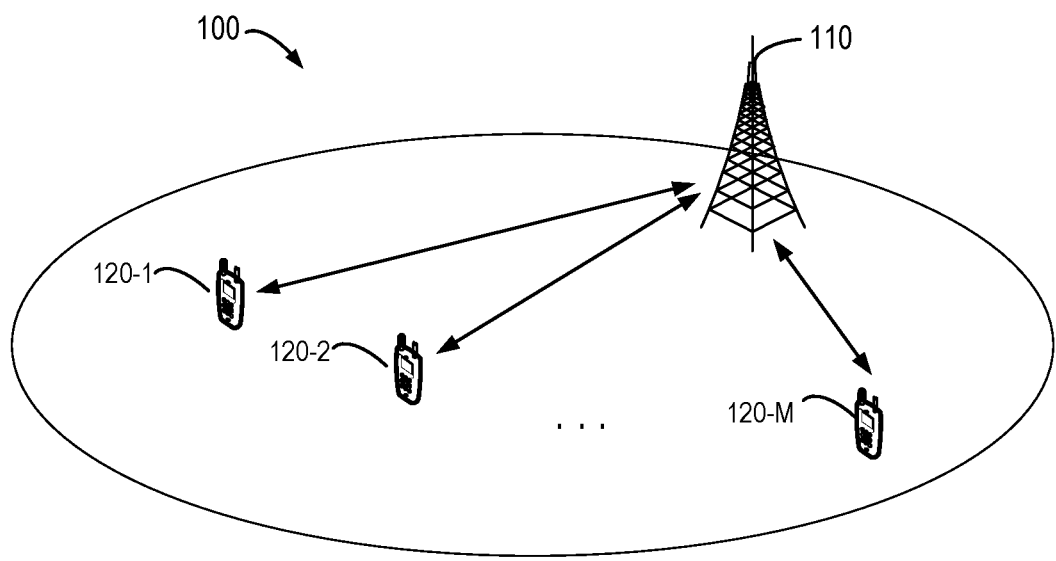
FIG. 1 illustrates a schematic diagram of a communication system according to embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.65G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "communication device" refers to a network device and/or a terminal device. The term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, further studies on the MIMO technology are needed to improve system performance. In MIMO systems, beamforming is a critically important part, which utilizes Channel state information (CSI) to maximize the channel capacity. The term "beamforming" used herein refers to a technique that focuses a wireless signal towards a specific receiving device, rather than having the signal spread in all directions from a broadcast antenna. With optimal beamforming algorithms, optimal beams can be found and used to transmit required data to user equipments (UEs).

If a base station transmits signals in beams which interfere with each other, UEs would fail to receive correct signals or suffer from degraded experiences. According to conventional technologies, for single-user MIMO (SU-MIMO) systems, Eigen beamforming (EBF) is the optimal beamforming method which uses the optimal beam(s) to transmit data to specific UE.

For example, the channel matrix of a specific UE may be represented as H of which shape is M×N. Then it can be decomposed as below using singular value decomposition (SVD).

$$H = UDV^H \quad (1)$$

where the parameters U and V are unitary matrices, that is, $U^H U = I$ and $V^H V = I$, the parameter I is the identity matrix. The parameter D is a diagonal matrix of which diagonal elements are singular values of channel matrix H.

Since it is customary to formulate the Eigen based beamforming in terms of Eigen values instead of singular values, the parameter D can be written as $D = \text{diag}\{\sqrt{\lambda_1}, \sqrt{\lambda_2}, \ldots, \sqrt{\lambda_r}\}$ where the parameter $\lambda_i$ denotes the eigenvalues of $H^H H$ and the parameter r is the rank of H. Without loss of generality, it is assumed that $\lambda_1 > \lambda_2 > \ldots > \lambda_r$.

Generally, right singular vectors, in the following referred to as eigenvector(s), corresponding to the largest one or more eigenvalues are used as beamforming vector. Taking a common configuration as an example, it is assumed only the eigenvector corresponding to the largest eigenvalue $\lambda_i$ is used as beamforming vector, that is, the first column of V, denoted as $v_1$, is used as beamforming vector.

To receive data correctly, the UE needs to combine the signals received at different antennas. Generally, combining weights are calculated based on channel estimation at UE side. Assuming that pilot symbols are transmitted using the same beamforming with data symbols, effective channel estimated by UE may be $Hv_1 = UDV^H v_1 = \sqrt{\lambda_1} u_1$. Assuming that simplest maximum-ratio combining (MRC) receiver is used, the combining weights may be $\sqrt{\lambda_1} u_1^H$ for current UE.

The required data may be denoted as s and the received data may be denoted as ŝ, and the noise may be denoted as n. The received data for the UE may be represented as below:

$$\hat{s} = \sqrt{\lambda_1} u_1^H (Hv_1 s + n) = \sqrt{\lambda_1} u_1^H UDV^H v_1 s + \sqrt{\lambda_1} u_1^H n \quad (2)$$

$$= (\lambda_1, 0, \ldots, 0) \begin{pmatrix} 1 \\ 0 \\ \vdots \\ 0 \end{pmatrix} s + \sqrt{\lambda_1} u_1^H n = \lambda_1 s + \sqrt{\lambda_1} u_1^H n$$

However, for multi-user MIMO (MU-MIMO), EBF is no longer the best. For MU-MIMO cases, correlations between co-scheduled UEs often exist in real-world systems, which is the cause of co-channel interference (CCI). EBF does not take these correlations into consideration, thus, it often suffers from performance degradation caused by CCIs. The interferences between beams of different UEs could significantly degrade UE experiences. According to conventional technologies, zero forcing (ZF) beamforming is a classical method for MU-MIMO downlink systems. It aims to eliminate the multi-user interference (MUI) between scheduled UEs.

When UEs have multiple antennas, block-diagonal zero-forcing (BD-ZF) beamforming should be used to achieve better performances. Assuming that there are K UEs served by the same BS, $H = (H_1^H, H_2^H, \ldots, K_K^H)^H$ is the grouped channel matrix, where $H_k$ is an $M_k \times N$ channel matrix of kth UE and $M_k$ is the number of antennas at kth UE.

For single-antenna UEs where $M_k = 1$, (k=1, 2, ... K), ZF beamforming has a simple form as below.

$$W = H^H (HH^H)^{-1} \quad (3)$$

where the kth column of W, i.e. $w_k$, is the beamforming vector for kth UE.

For multi-antenna UEs where $M_k \geq 2$, (k=1, 2, ... K), original ZF become sub-optimal, then a novel solution named BD-ZF has been proposed. For BD-ZF, the beamforming vector $w_k$ of kth UE is selected to satisfy the following formula.

$$\max_{\|w_k\|_2^2 = 1} \|H_k w_k\|_2^2 \text{ subject to } H_i w_k = 0, \forall i \neq k \quad (4)$$

where $H_k$ is an $M_k \times N$ channel matrix of kth UE.

There are many solutions for this optimization problem. According to conventional technologies, one solution is given as below.

$$w_k = (I - \overline{H}_k^\dagger \overline{H}_k) q_k \quad (5)$$

where $\overline{H}_k = (H_1^H, \ldots, H_{k-1}^H, H_{k+1}^H, \ldots, H_K^H)^H$ is an extended channel matrix that excludes $H_k$ which is an $M_k \times N$ channel matrix of kth UE, only, $\overline{H}_k^\dagger$ is the pseudo-inverse of $\overline{H}_k$, i.e. $\overline{H}_k^\dagger = \overline{H}_k^H (\overline{H}_k \overline{H}_k^H)^{-1}$, and $q_k$ is the right singular vector corresponding to the largest singular value of $H_k (I - \overline{H}_k^\dagger \overline{H}_k)$.

Generally, ZF algorithms, including BD-ZF, have a dimension limitation that the total number of all antennas at UE sides cannot be larger than the total number of antennas at network device side. Otherwise, ZF algorithms may fail to mitigate the CCIs. In addition, the BD-ZF solution in Eq.(5) often has a high computational complexity, especially when many multi-antenna UEs are co-scheduled together. These two fatal drawbacks severely limit its application in practical MU-MIMO systems. BD-ZF is very sensitive to channel estimation errors and computationally intensive, it can hardly be applied in practical systems.

According to other conventional technologies, it has proposed a leakage-based beamforming method by maximizing the signal-to-leakage-and-noise ratio (SLNR) for all co-scheduled UEs. The SLNR for the kth UE is defined as below:

$$SLNR_k = \frac{\|H_k w_k\|^2}{M_k \sigma_k^2 + \sum_{i=1, i \neq k}^{K} \|H_i w_k\|^2} = \frac{\|H_k w_k\|^2}{M_k \sigma_k^2 + \|\overline{H}_k w_k\|^2} \quad (6)$$

where $\overline{H}_k = (H_1^H, \ldots, H_{k-1}^H, H_{k+1}^H, \ldots, H_K^H)^H$ is an extended channel matrix that excludes $H_k$ which is an $M_k \times N$ channel matrix of kth UE, only, $\sigma_k^2$ is the variance of noise $n_k$, of which entries are assumed to be complex Gaussian variables with zero-mean. Then for kth UE, a new matrix is calculated as below:

$$\tilde{R}_k = (M_k \sigma_k^2 I - \overline{H}_k^H \overline{H}_k)^{-1} H_k^H H_k \quad (7)$$

where the beamforming vector $W_k$ of kth UE would be the eigenvector corresponding to the largest eigenvalue of the matrix $\tilde{R}_k$, $\overline{H}_k = (H_1^H, \ldots, H_{k-1}^H, H_{k+1}^H, \ldots, H_K^H)^H$ is an extended channel matrix that excludes $H_k$ which is an $M_k \times N$ channel matrix of kth UE, only, $\sigma_k^2$ is the variance of noise $n_k$, of which entries are assumed to be complex Gaussian variables with zero-mean.

The max-SLNR algorithm is more flexible than ZF algorithm and can work well even the total number of all antennas at UE sides are larger than total number of antennas at network device side. But it has an even higher computational complexity due to inverse matrix calculation for large matrices. This fatal drawback limits its application in practical systems.

According to another conventional technology, it proposes a novel beamforming method which is referenced as Eigen zero forcing (EZF).

The channel matrix of kth UE can be represented as $H_k$, it can be decomposed as below using SVD.

$$H_k = U_k D_k V_k^H \quad (8)$$

where the right singular vector (referred to as eigenvector $v_{k1}$) corresponding to the largest singular value is used as the initial beamforming vector and the Eigen receiver, i.e. the conjugate transpose of the first column of $U_k$, may be denoted as $u_{k1}^H$ for kth UE. Then, based on the Eigen receiver, the effective channel between base station antennas and received signals after receiver would be $u_{k1}^H H_k = \sqrt{\lambda_{k1}} v_{k1}^H$, which is the Eigen channel of kth UE.

Based on each UE's Eigen channel, the extended Eigen channel matrix $H_{eig}$ can be constructed as below:

$$H_{eig} = (\sqrt{\lambda_{11}} v_{11}, \sqrt{\lambda_{21}} v_{21}, \ldots, \sqrt{\lambda_{K1}} v_{K1})^H \quad (9)$$

Since the beamforming vectors are all normalized to have unit norm, $\sqrt{\lambda_{k1}}$ can be omitted to simplify the calculations, that is, $H_{eig} = (v_{11}, v_{21}, \ldots, v_{K1})^H$ is also acceptable.

The beamforming matrix can be calculated as below:

$$W = H_{eig}^H (H_{eig} H_{eig}^H)^{-1} \quad (10)$$

where the kth column of W, i.e. $w_k$, is the EZF beamforming vector of kth UE.

When each UE utilizes more than one beams for data transmission, the Eigen channel matrix may be constructed with all active beams of co-scheduled UEs. In this scenario, each beam can be treated as a virtual UE and for each virtual UE, an updated beamforming vector would be calculated by EZF algorithm, which would then be used for data transmission.

However, the optimal Eigen based receivers cannot be obtained by the UEs due to existence of correlations between channel matrices of co-scheduled UEs. Generally, for UEs with low correlations, UEs can get approximate Eigen receivers based on channel matrices estimated at UEs side. But for UEs with high correlations, the receivers based on channel matrices estimated by UEs may deviate a lot from the optimal receivers and the residual interferences would degrade the UEs experiences.

In addition, EZF still has a dimension limitation that the total number of active beams of UEs should not be larger than the total number of antennas at BS. This limitation is not so strict as ZF's dimension limitation, but it still limits the application of EZF when more UEs are co-scheduled together.

According to other conventional technologies, it proposes an iterative zero forcing precoding algorithm which is referred as classical iterative zero forcing (CIZF) for MU-MIMO downlink systems where a single data stream is allocated to each user. In this scenario, each UE has only one beamforming vector, thereby making the problem much simpler.

For kth UE, its channel matrix can be represented as $H_k$, its beamforming vector can be denoted as $w_k$, its receiving vector can be represented as $r_k$, and its required data can be denoted as $s_k$, then the global received signals at all UEs may be:

$$\hat{s} = H_e W s + \hat{n} \quad (11)$$

where $H_e = (H_1^H r_1, H_2^H r_2, \ldots, H_K^H r_K)^H$ is the equivalent global channel matrix, $W = (w_1, w_2, \ldots, w_K)$ is the global precoding matrix, $s = (s_1, s_2, \ldots, s_K)^T$ is the global transmitted signals, and $\hat{n} = (n_1^H r_1, n_2^H r_2, \ldots, n_K^H r_K)^H$ is the received noise.

Assuming that all receiving vectors are known, i.e. $r_1, r_2, \ldots, r_K$ is known at BS, ZF algorithm can be used to calculate the precoding matrix $W = H_e^H (H_e H_e^H)^{-1}$. Based on this assumption, conventional technologies propose a joint optimization algorithm to alternatively update the receiving vectors and beamforming vectors in an iterative pattern as Table 1 below.

TABLE 1

(1) Initialize $r_k^{(0)} = (1,0,\ldots,0)^T$, k = 1,2, ..., K.
(2) Calculate $H_e^{(0)}$, and $W^{(0)} = H_e^{(0)H}(H_e^{(0)}H_e^{(0)H})^{-1}$, normalize each column of $W^{(0)}$ to unit length, initalize i = 0.
(3) For kth UE, update $r_k^{(i+1)} = H_k W_k^{(i)}$, normalize $r_k^{(i+1)}$ to unit vector.
(4) Calculate $H_e^{(i+1)}$, and $W^{(i+1)} = H_e^{(i+1)H}(H_e^{(i+1)}H_e^{(i+1)H})^{-1}$, normalize each column of $W^{(i+1)}$ to unit vector.
(5) If $\|H_e^{(i+1)}W^{(i+1)} - H_e^{(i)}W^{(i)}\|^2 \leq \varepsilon$ ($\varepsilon = 10^{-12}$), terminate the iterations, otherwise return to step 3).

By alternatively updating the receiving and beamforming vector of each UE, CIZF can get the optimal beam for each UE at base station as well as the optimal receiving vector at UE side.

However, classical iterative zero forcing algorithm may be dedicated to MU-MIMO downlink systems where a single data stream is allocated to each user. Therefore, it has very limited usage in practical systems wherein each UE often has multiple data streams.

For MU-MIMO downlink system, the CCIs can be split into two parts: one part can be sensed by the UE receivers, the other part cannot be sensed by the UE receivers. In other words, some of the CCIs have no influences on the received signals, but most beamforming schemes aim to mitigate all the interferences from base station view. The EZF beamforming algorithm only aims to suppress the interferences sensed by optimal receiver. Thus, it has a much lower complexity than original ZF beamforming algorithm.

However, optimal receivers cannot be obtained by the UEs. If the correlations between scheduled UEs are small, common receivers at UE sides like maximum-ratio combining (MRC) may suppress the residual interferences to some extent. But for UEs with high correlations, the residual interferences cannot be ignored and would degrade the performance.

According to embodiments of the present disclosure, an iterative zero forcing (IZF) scheme is proposed. Embodiments of the present disclosure take practical receivers into consideration, to further mitigate the interferences sensed by terminal devices. The beamforming scheme according to embodiments of the present disclosure has many advantages. For example, embodiments of the present disclosure tackle interferences from terminal device view, to mitigate the interferences which really affect the received signals of terminal devices. Embodiments of the present disclosure do not assume that terminal devices utilize Eigen receivers but consider more practical receivers used by the terminal devices to mitigate the interferences. Embodiments of the present disclosure have high flexibility, different interference cancelling methods can be used to replace the ZF method.

FIG. 1 illustrates a schematic diagram of a communication system 100 in which embodiments of the present disclosure can be implemented. The communication system 100, which is a part of a communication network, comprises a device 110 which is referred to as "first device 110". The communication system 100 further comprises a device 120-1, a device 120-2, . . . . , a device 120-M, which can be collectively referred to as "second device(s) 120." The M can be any suitable integer number. It is to be understood that the number of devices shown in FIG. 1 is given for the purpose of illustration without suggesting any limitations. It also should be noted that the first device 110 and the second device 120 can be interchangeable. The devices 120 may be co-scheduled terminal devices. The term "co-scheduled terminal devices" used herein refer to terminal devices that use the same resources in frequency and/or time domains.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
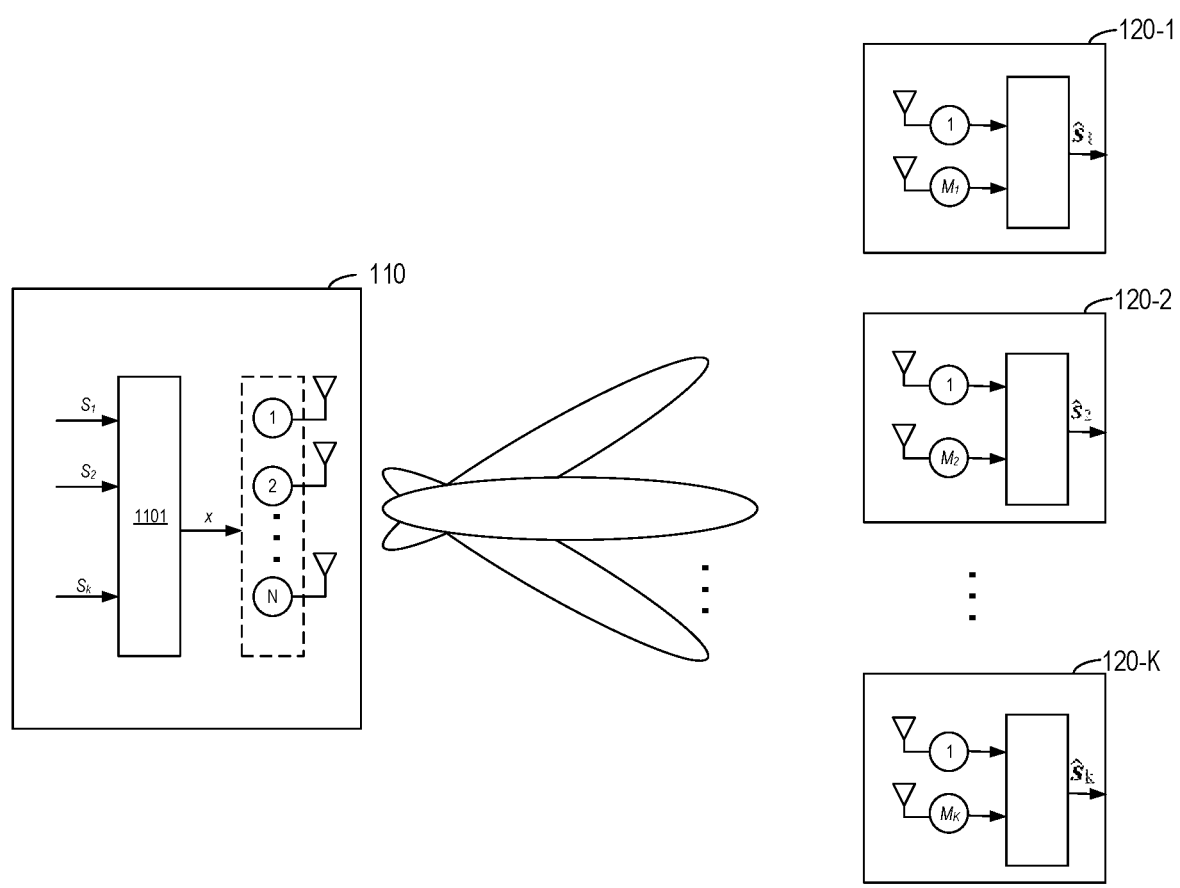
FIG. 2 illustrates a schematic diagram of a MIMO system according to embodiments of the present disclosure.

FIG. 2 illustrates a schematic diagram of a MIMO system according to embodiments of the present disclosure. As shown in FIG. 2, the first device 110 with N antennas may serve more than one second devices 120. The kth device 120-$k$ may have $M_k$ antennas. As shown in FIG. 2, the first device 110 may comprise a beamforming module 1101 which have input signals, $s_1, s_2, \ldots,$ and $s_K$ for transmission. The second device 120-1 may receive signal from the first device 110 and obtain the signal $\hat{s}_1$. The second device 120-2 may receive signal from the first device 110 and obtain the signal $\hat{s}_2$. The device 120-$k$ may receive signal from the first device 110 and obtain the signal $\hat{s}_k$. It should be noted that the parameter k can be any suitable number.

For the purpose of illustrations, the channel matrix of the device 120-$k$ can be represented as $H_k$ and the beamforming weights for the device 120-$k$ can be represented as $w_k$. The transmission property of the channel which can be estimated at the device 120-$k$ can be represented as $H_k w_k$, which is the effective channel between the transmitted signal $s_k$ and the antennas of the device 120-$k$. The device 120-$k$ may utilize the estimated effective channel $H_k w_k$ to calculate the received signal $\hat{s}_k$.

Considering simplest receiver MRC which just utilizes the conjugate transpose of the estimated effective channel, i.e. $w_k^H H_k^H$, the received signal $\hat{s}_k$ can be represented as $$\hat{s}_k w_k^H H_k^H (H_k x + n_k) = w_k^H H_k^H H_k W s + w_k^H H_k^H n_k \quad (12)$$

where $x = Ws = \sum_{i=1}^{K} w_i s_i$ represents the beamformed signals on the antennas of the first device 110, s represents the signal at the first device 110, $w_k^H H_k^H$ represents the conjugate transpose of the estimated effective channel of the device 120-$k$, $H_k$ represents the channel matrix of the device 120-$k$, and $n_k$ represents the noise on the channel between the device 120-$k$ and the first device 110.

The received signal $n_k$ can be further written as the sum of three items: the required signal, the interferences and the noise, shown below.

$$\hat{s}_k = w_k^H H_k^H h_k w_k s_k + w_k^H H_k^H h_k (\sum_{i=1, i \neq k}^{K} w_i s_i) + w_k^H h_k^H n_k \quad (13)$$

where $w_k^H H_k^H$ represents the conjugate transpose of the estimated effective channel of the device 120-$k$, $H_k$ represents the channel matrix of the device 120-$k$, $w_k$ represents the beamforming weights for the device 120-$k$, $s_k$ represents the transmitted signal, $H_k(\sum_{i=1, i \neq k}^{K} w_i s_i)$ represents the interferences between devices 120, and $n_k$ represents the noise on the channel between the device 120-$k$ and the first device 110.

Based on Eq.(13), the target of maximizing the channel gain and nulling the interferences can be converted as the following:

$$\max_{\|w_k\|_2^2 = 1} \|H_k w_k\|_2^2 \text{ subject to } w_k^H H_k^H H_k w_i = 0, \forall i \neq k \quad (14)$$

where $w_k^H H_k^H$ represents the conjugate transpose of the estimated effective channel of the device 120-$k$, $H_k$ represents the channel matrix of the device 120-$k$, $w_k$ represents the beamforming weights for the device 120-$k$, and $H_k w_i$ represents effective interference channel.

The core idea of Eq. (14) is that the effective channel $H_k w_k$ of the device 120-$k$ should be orthogonal with the "effective interference channel" $H_k w_i$ of co-scheduled second devices.

For simplicity, the covariance matrix of the device 120-$k$ can be represented as $R_k = H_k^H H_k$. Then Eq.(14) can be written as below:

$$\max_{\|w_k\|_2^2 = 1} w_k^H R_k w_k \text{ subject to } w_k^H R_k w_i = 0, \forall i \neq k \quad (15)$$

where $R_k$ represents the covariance matrix of the device 120-$k$, $H_k$ represents the channel matrix of the device 120-$k$, $w_k$ represents the beamforming weights for the device 120-$k$, and $H_k w_i$ represents effective interference channel. To solve the optimization problem described in Eq.(15), embodiments of the present disclosure aim at suppressing interferences between effective channels and can achieve better performance.

Figure 3:
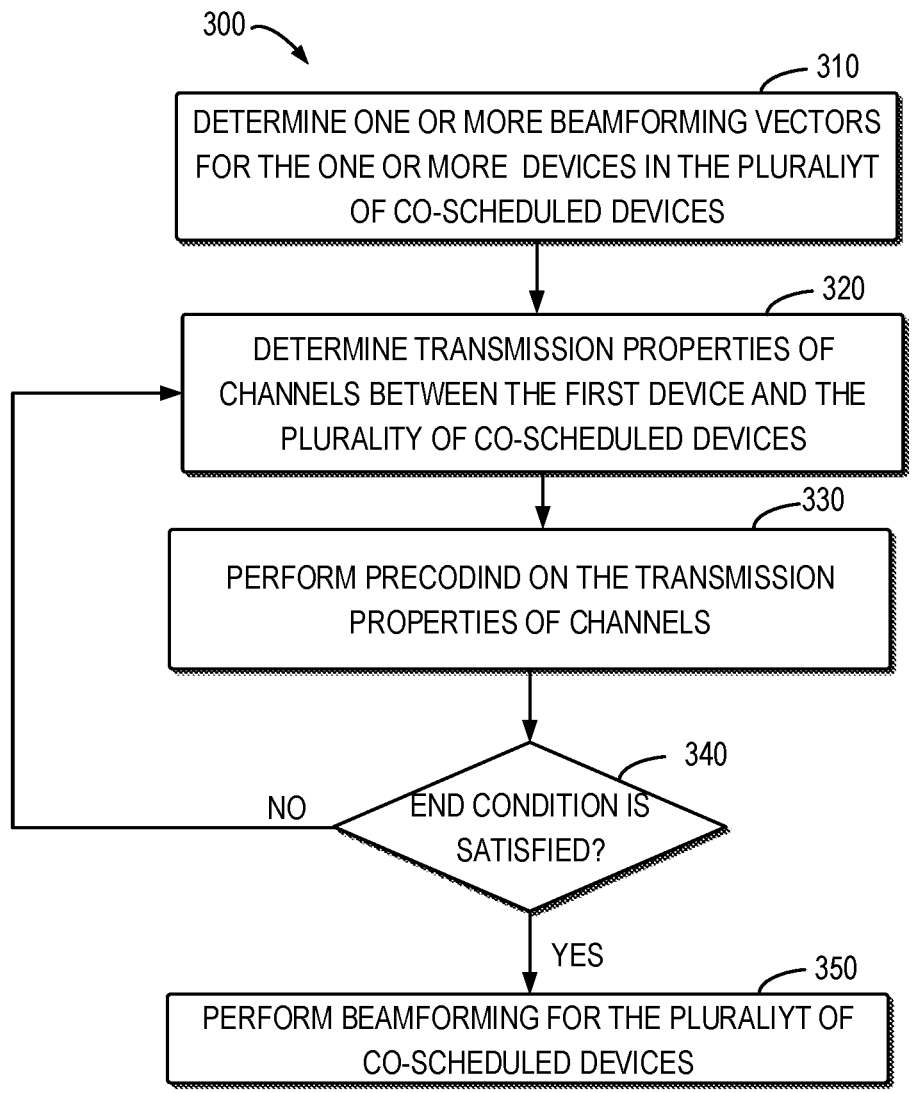
FIG. 3 illustrates a flow chart of a method according to embodiments of the present disclosure.

FIG. 3 illustrates a flow chart of method 300 according to embodiments of the present disclosure. The method 300 can be implemented at any suitable devices. For example, the method may be implemented at the first device 110. It should be noted that the method 300 can also be implemented at the second device 120. For purpose of illustrations, embodiments of the present disclosure are described with reference to FIGS. 2 and 3 in details.

At block 310, the first device 110 determines one or more beamforming vectors for at least one device (for example, the device 120-$k$) in the plurality of co-scheduled devices 120. It should be noted that the device 120-$k$ is only an example. The one or more beamforming vectors for the device 120-$k$ can be represented as $w_k$, such as the dominating eigenvectors $v_k$. If the device 120-$k$ has 2 or more beams, the beamforming vectors can be represented as $w_k = (w_{k1}, w_{k2}, \ldots)$, where $w_{ki}$ is the beamforming vector for the ith beam of the device 120-$k$. In some embodiments the first device 110 may determine the one or more beamforming vectors randomly.

Alternatively or in addition, the first device 110 may determine the one or more eigenvectors of a covariance matrix $R_k$ of the plurality of co-scheduled devices 120 and may regard the one or more eigenvectors as the one or more beamforming vectors. The one or more beamforming vectors may be optimal SU-MIMO beamforming vector, which can be calculated by decomposing the covariance matrix $R_k$ with eigenvalue decomposition (EVD) algorithms.

Suppose the covariance matrix $R_k$ has been decomposed by any EVD algorithm as below.

$$R_k = V_k \Sigma_k V_k^H \quad (16)$$

where $V_k$ are unitary matrix, i.e. $V_k^H V_k = I_N$, and $\Sigma_k = \text{diag}\{\lambda_{k1}, \lambda_{k2}, \ldots, \lambda_{kr}\}$ is a diagonal matrix whose diagonal elements are eigenvalues (in descending order) of $R_k$.

Further, the eigenvectors corresponding to largest one or more eigenvalues of the device 120-k which is/are used for data transmission can be denoted as $v_k = (V_{k1}, V_{k2}, \ldots)$, then the best beamforming vectors for the device 120-k may be:

$$w_k = v_k (k=1,2,\ldots,K) \quad (17)$$

With such Eigen initializations, the optional orthogonalization step in generalized IZF algorithm can be omitted and the IZF can converge much faster in general. Generally, 1 iteration may be enough for full-rank terminal devices and 3 iterations may be enough for non-full-rank terminal devices. The term "full-rank terminal device" used herein refers to the terminal device adopts the same number of beams as its receiving antennas and the term "non-full-rank terminal device" used herein refer to the terminal device adopts less number of beams than its receiving antennas.

The first device 110 iteratively updates the one or more beamforming vectors by performing the following. At block 320, the first device 110 determines the transmission properties of the channels between the first device 110 and the devices 120. For example, the effective channel matrix for the devices 120 may be represented as below.)

$$H_{ef} = (R_1 w_1, R_2 w_2, \ldots, R_K w_K)^H \quad (18)$$

where $H_{ef}$ represents the effect channel matrix, $R_k$ represents covariance matrix of the device 120-k and $w_k$ represents the beamforming vector(s) of the device 120-k.

At block 330, the first device 110 performs precoding on the transmission properties of channels to mitigate interferences between the plurality of co-scheduled devices 120. In some embodiments, the first device 110 may perform an interference cancelling operation on the one or more beamforming vectors to update the one or more beamforming vectors. For example, the first device 110 may perform a zero forcing operation. It should be noted that the first device may perform any suitable interference cancelling operation.

In some embodiments, the updated beamforming matrix can be represented as below:

$$W = H_{ef}^H (H_{ef} H_{ef}^H)^{-1} \quad (19)$$

where the kth group of columns of W, i.e. $w_k$, is/are the updated beamforming vector(s) of the device 120-k, $H_{ef}$ represents the effect channel matrix.

In some embodiments, the first device 110 may perform the IZF on the transmission properties of channels. The procedure of IZF can be treated as power iteration (PI) with null-interference constraints for co-scheduled devices 120. If the Eq.(19) is modified to $W = H_{ef}^H$, then it becomes the classical power iteration algorithm. The right item $(H_{ef} H_{ef}^H)^{-1}$ in Eq.(19) projects the separate beamforming vectors to nulling spaces of co-scheduled devices 120.

Therefore, IZF can be seen as a generalization of PI in MU-MIMO cases while the classic PI is only dedicated to SU-MIMO cases.

In other words, classic PI algorithm tries to find the best beam for each UE without considering co-scheduled terminal devices, and it is one implementation of EBF method which calculates the best selfish beam for each terminal device. Embodiments of the present disclosure take co-scheduled terminal devices into consideration and determine the best unselfish beam for each terminal device. What's more, since some cell-edge terminal devices may have very poor channel conditions, ZF operation may be not a proper way. Since generalized IZF is very flexible, the corresponding column in $(H_{ef} H_{ef}^H)^{-1}$ can be set as $(0, \ldots, 1, \ldots, 0)^T$ to make other co-scheduled terminal devices producing no interferences to this special terminal device. But this special terminal device may still utilize its Eigen beam to maximize its performance.

As mentioned above, the device 120-k may have more than one beamforming vector. In this situation, the device 120-k may orthogonalize the two beams with each other, i.e. $w_{ki}^H w_{kj} = 0$, $\forall i \neq j$ for the device 120-k. Further, as discussed with the reference to block 310, the one or more beamforming vectors may be the eigenvectors of a covariance matrix $R_k$. In this situation, the orthogonalization step may be omitted even the device 120-k has more than one beamforming vector.

In other embodiments, the first device 110 may determine a regularization parameter based on signal-to-noise ratios of the plurality of co-scheduled devices 120. In this way, the IZF may be more robust and achieve better performance in some cases. For example, the first device 110 may determine the number of beams of the plurality of co-scheduled devices 120. If the number of beams of the plurality of co-scheduled devices 120 is larger than the number of antennas of the first device 110, the EZF cannot null the interferences and may suffer from degraded performance.

The regularization parameter may be added into the interferences cancelling operation during updating the beamforming matrix. For example, the Eq.(19) can be rewritten as below:

$$W = H_{ef}^H (H_{ef} H_{ef}^H + \beta I)^{-1} \quad (20)$$

where I represents an identity matrix and $\beta$ represents the regularization parameter. Generally, $\beta$ is determined by the signal-to-noise ratio (SNR) of UEs. Assuming that all co-scheduled devices 120 have the same SNR $\rho$, $\beta$ can be set as the reciprocal of $\rho$, i.e. $\beta = 1/\rho$.

Alternatively, different terminal devices may often have different SNRs. Assuming that the entries of noise $n_k$ received at the device 120-k are complex Gaussian variables with zero-mean and variance $\sigma_k^2$, the SNR for the device 120-k can be defined as $1/\sigma_k^2$. Then, Eq.(19) can be replaced by the following regularized version:

$$W = H_{ef}^H (H_{ef} H_{ef}^H + \Lambda)^{-1} \quad (21)$$

where $\Lambda = \text{diag}\{M_1 \sigma_1^2 I_1, M_2 \sigma_2^2 I_2, \ldots, M_K \sigma_K^2 I_K\}$ is the regularization term, $M_k$ represents the number of antennas for the device 120-k, and $I_k$ is the identity matrix of which size are determined by the number of active beams for the device 120-k. For example, if 2 beams are used for data transmission, $I_k$ would be a 2×2 identity matrix.

In this way, this regularized version of IZF, named iterative regularized zero forcing (IRZF) beamforming, has no dimension limitations. It has larger applications than general ZF and EZF algorithms. For example, when the total number of all antennas at the terminal device side is larger than total number of antennas at network device side, general ZF algorithms cannot work but EZF, IZF and IRZF can work well. When the total number of all beams at terminal device sides is larger than total number of antennas at network device side, general ZF, EZF and IZF cannot work anymore but IRZF could still work well.

Similarly to the IZF, adopting the eigenvectors as initial beamforming vectors is still the best choice for IRZF. Similarly, IRZF with eigenvectors as initial beamforming vectors can be named as iterative Eigen regularized zero forcing (IERZF) for convenience.

The one or more beamforming vectors are iteratively updated until an end condition is satisfied. Referring back to FIG. 3, at block 340, the first device 110 determines whether the end condition is satisfied. The end condition may be the threshold number of the iterations. For example, the one or more beamforming vectors are iteratively updated until the number of the iteration reaches a threshold number.

Alternatively or in addition, the end condition may be the threshold value for interference. For example, the one or more beamforming vectors are iteratively updated until the interference is below a threshold value. Generalized IZF can have an explicit end condition because $(H_{ef}H_{ef}^H)^{-1}$ in Eq. (19) just represents the interferences between co-scheduled UEs. Denote matrix $A \triangleq (H_{ef}H_{ef}^H)^{-1}$ whose entry of ith row and jth column is denoted as $a_{ij}$, and denote a function off$(A)=\Sigma_{i\neq j}|a_{ij}|^2$ which summarizes all off-diagonal entries in A. Then when off(A) is zero, IZF is converged to the optimal solution. Generally, when off(A) is no larger than $\varepsilon$ which is the threshold value for interference, the iteration is terminated.

If the end condition is satisfied, the updated one or more beamforming vectors can be output. For example, the first device 110 may output the columns of W, i.e. $w_k$ (k=1, 2, . . . , K), as the final beamforming vector(s) for co-scheduled devices 120.

At block 350, the first device 110 may perform beamforming for the plurality of co-scheduled devices 120 based on the iteratively updated one or more beamforming vectors. Compared with conventional technologies, embodiments of the present disclosure have many advantages: low complexity: IZF has much lower computational complexity than BD-ZF and max-SLNR algorithms; large application range: IRZF has the same application range as max-SLNR and IRZF can be applicable even if the total number of antennas/beams of terminal devices are greater than the number of antennas at the base station, while BD-ZF cannot be used in this scenario; better performance; and high flexibility.

Further, embodiments of the present disclosure are less complex than conventional technologies. For simplicity, it assumes that K terminal devices are paired and each terminal device has $\overline{M}$ antennas, the network device has N antennas for one polarization. For BD-ZF, max-SLNR, EZF and IEZF algorithms, they all need to calculate the covariance matrices with the same size and the eigenvector(s) of these covariance matrices. Apart from this, the main differences for these algorithms come from the calculation of inverse matrices.

For BD-ZF algorithm, it needs to calculate K times of inverse matrices with size of $(K-1)\overline{M} \times (K-1)\overline{M}$, so the dominating computational complexity of BD-ZF is $O(K((K-1)\overline{M})^3)$, apart from EVD computations. For max-SLNR algorithm, it needs K times of calculation of inverse matrices with size of N×N, so the dominating computational complexity of max-SLNR is $O(KN^3)$, apart from EVD computations. Since BD-ZF can only be applicable when $K\overline{M} \leq N$, BD-ZF has a little lower complexity than max-SLNR.

For EZF and each iteration of IEZF, only one time of inverse matrices with size of $K_b \times K_b$ needs to be calculated, where $K_b$ is the total number of beams used for data transmission, generally $K_b \leq K\overline{M} \leq N$. Hence, the dominating computational complexity of EZF is $O(K_b^3)$ and the dominating computational complexity of IEZF is $O(\text{iterNum} \times K_b^3)$, apart from EVD computations.

Taking a common case in practical systems as an example, where the network device has 64 antennas (assuming 32 antennas are used for one polarization, i.e. N=32), the dominating complexity of these beamforming algorithms, apart from EVD computations, can be calculated as shown in Table 2. It can be seen that EZF and IEZF have much lower complexity than BD-ZF and max-SLNR algorithms.

TABLE 2

| N = 32 | BD-ZF | Max-SLNR | EZF | IEZF iterNum = 3 |
|---|---|---|---|---|
| K = 8, $\overline{M}$= 2, $K_b$ = 8 (1 beam per UE) | $O(8 \times 14^3)$ | $O(8 \times 32^3)$ | $O(8^3)$ | $O(3 \times 8^3)$ |
| K = 8, $\overline{M}$= 4, $K_b$ = 16 (2 beams per UE) | $O(8 \times 28^3)$ | $O(8 \times 32^3)$ | $O(16^3)$ | $O(3 \times 16^3)$ |

For iterative zero forcing scheme, the main complexity comes from two parts: one is the eigenvector calculation or EVD part, the other is the pseudo-inverse or ZF part. The dimension of the covariance matrix determines the computational complexity of the first part, while the total number of beams of co-scheduled terminal devices determines the computational complexity of the second part.

Generally, the network device may often have up to 64 transceivers (TRXs) for downlink transmissions, and EVD for 64×64 covariance matrix should be calculated to get the optimal eigen beam. Assuming that power iteration is used for EVD calculation, the complexity for each eigenvector would be at the level of $O(64^2)$. Assuming K co-scheduled rank-2 terminal devices are served by such network device, there would be totally 2K beams and the complexity of pseudo-inverse would be at the level of $O((2K)^3)$.

Figure 4:
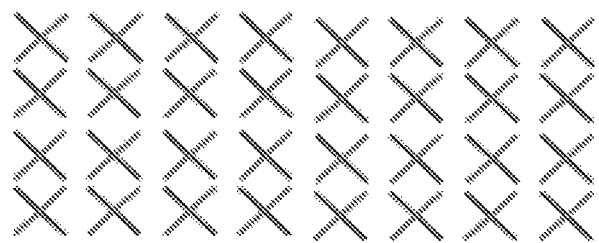
FIG. 4 illustrates a schematic diagram of transceiver layouts according to embodiments of the present disclosure.

To reduce the total complexity and to facilitate the application of IZF algorithms including the special case EZF into practical product, some conventional techniques can be adopted. For example, polarization averaging can be adopted to reduce the dimension of covariance matrix. Generally, 64 TRXs are laid in 4×8×2 pattern as shown in FIG. 4 and there are 16 TRXs in horizontal (8 TRXs for each polarization) and 8 TRXs in vertical (4 TRXs for each polarization). As for the ordering of N TRXs (i.e., columns of H in Eq.(1)), the array column index changes fastest, then the array row index, and finally the polarization index. So, all the elements of the same polarization are indexed contiguously and, within each polarization, all the elements in the same array row are indexed contiguously. Since each polarization has 32 TRXs in total and 2 polarizations can adopt the same beam weight for downlink transmission, this character can be used to reduce the dimension of the covariance matrix and the total number of beams for co-scheduled terminal devices.

In detail, when adopting polarization averaging, EVD for 32×32 covariance matrices would be calculated instead, which may reduce the computational complexity to the level of $O(32^2)$ for each eigenvector. Under the same assumption that K co-scheduled rank-2 terminal devices are served by the network device, there would be totally K beams and the complexity of pseudo-inverse would be reduced to the level of $O(K^3)$.

In addition, the computational complexity of EVD for covariance matrix can also be further reduced by adopting the Kronecker structure which decomposes the full-dimension EVD for a 32×32 covariance matrix to two independent EVDs for a 4×4 vertical covariance matrix and an 8×8 horizontal covariance matrix separately. And the eigenvectors of the 32×32 covariance matrix can be approximately recovered by calculating the Kronecker product of eigenvectors of the 4×4 covariance matrix and the eigenvectors of the 8×8 covariance matrix. Since calculating eigenvectors for 4×4 and 8×8 covariance matrices has a much lower complexity than calculating eigenvectors for 32×32 covariance matrices, adopting such approximation can reduce the computational complexity a lot and facilitate the application of EBF, EZF and IEZF algorithms if computing resources are quite limited.

Consider a practical TDD 5G system, the network device utilizes N TRXs (B TRXs per polarization) to serve K co-scheduled terminal devices in one cell with the same time/frequency resources. At the network device side, the N TRXs are laid in $N_{row} \times N_{col} \times N_{pol}$ pattern, for example, 64 TRXs can be laid in 4×8×2 pattern as shown in FIG. 4. At terminal device side, since practical terminal devices can have fewer transmit chains than receive chains, it assumes that each terminal device has R receive chains and T transmit chains (T≤R), and is served with L (L≤min(R, N)) layers.

Figure 5:
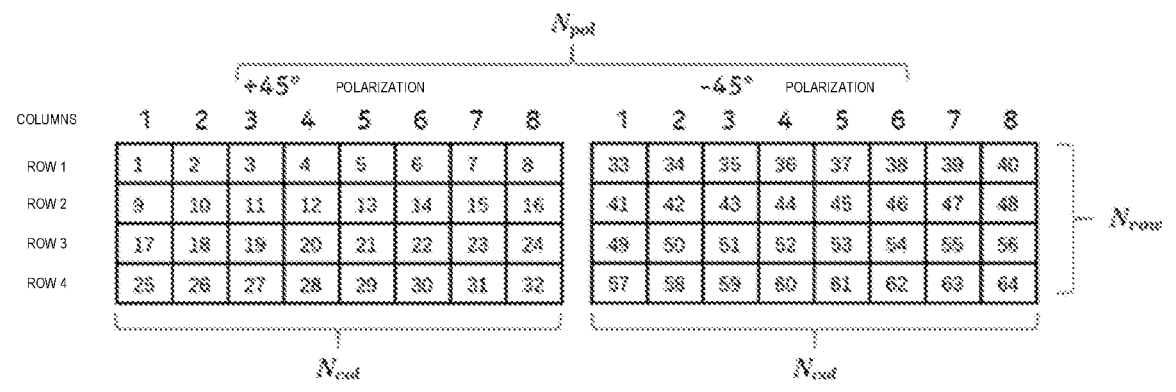

In TDD system, by exploiting the channel reciprocity, downlink channel matrices can be estimated from the sounding reference signal (SRS) on the uplink channel. The estimated channel of the device 120-k in slot t and PRB/RBG f can be denoted as $H_k(f, t)$, of which size is T×N. Each row of the matrix $H_k(f, t)$ corresponds to a UE transmit chain. The correspondence between the column indices of the matrix $H_k(f, t)$ to the physical TRX array locations in terms of array row, array column and array polarization is shown in FIG. 5 for the 4×8×2 array.

Generally, the generalized IZF beamforming can be applied in wideband or subband mode. Assume that P subbands span the total system bandwidth, and denote the set of physical resource blocks (PRBs) (or RBGs) in the s-th subband as the set $f_{|\mathcal{F}_s|} = \{f_1, f_2, \ldots, f_{|\mathcal{F}_s|}\}$, where $|f_{|\mathcal{F}_s|}|_s$ denotes the total number of PRB (or RBG) in a subband.

Figure 6A:
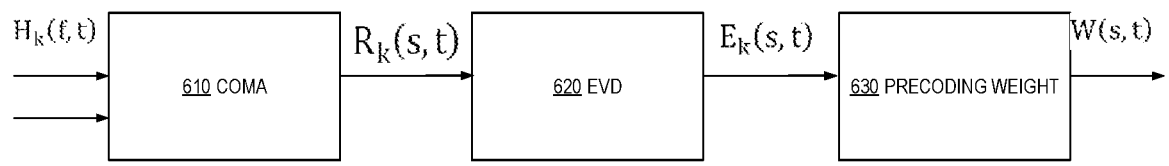
FIGS. 6A and 6B illustrate simplified block diagrams of implementation structures according to embodiments of the present disclosure.
Figure 6B:
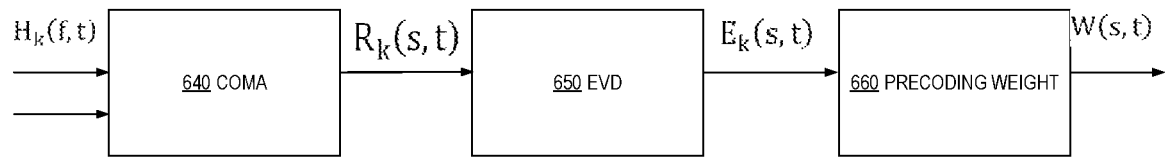

FIG. 6A illustrates an implementation of EZF and FIG. 6B illustrates an implementation of HVEZF. As shown in FIG. 6A, the covariance matrix (CoMa) module 610 may obtain the covariance matrix of the device 120-k on subband s in slot t which is calculated as $$R_k(s,t) = \frac{1}{|\mathcal{F}_s|} \sum_{f \in \mathcal{F}_s} H_k^H(f,t) H_k(f,t).$$

The EVD module 620 may obtain the conjugate transpose of the effective eigenchannel matrix of the device 120-k which is represented as $E_k(s,t) v = (v_{k1}, \ldots, V_{kL})$, where $v_{kl}$ is the l-th (full-dimension) eigenvector of $R_k(s, t)$. The precoding weight module 630 may obtain the beamforming vectors for all co-scheduled devices 120 which can be calculated by $W(s, t) = E(s, t)(E^H(s, t)E(s, t) + \beta I)^{-1}$, where $E(s, t) = (E_1(s, t), E_2(s, t), \ldots, E_K(s, t))$ is the extended eigenchannel matrix (compared Eq.(9)) for K co-scheduled UEs with size of N×KL and β is the (SNR dependent) regularization parameter.

When utilizing the polarization averaging and horizontal/vertical Kronecker decomposition, the process is quite different from the EZF process. As shown in FIG. 6B, the so-called HVEZF (horizontal & vertical EZF) is the simplified version of EZF which adopts polarization averaging as well as Kronecker structure.

In HVEZF process, both polarizations adopt the same beamforming vector, and the CoMa module 640 may obtain the eigenchannel matrix $E_k(s, t)$ for the device 120-k which becomes a N/2 by L/2 matrix and is only one quarter of the Eigen channel matrix in EZF process. Similar to the EZF process, the EVD module 650 may obtain $E(s, t) = (E_1(s, t), E_2(s, t), \ldots, E_K(s, t))$ which is the extended eigenchannel matrix for co-scheduled devices 120 with size of N/2×KL/2. The precoding weight module 660 may obtain final full-dimension beamforming vectors by:

$$W(s,t) = I_{N_{pol}} \otimes E(s,t)(E^H(s,t)E(s,t) + \beta I)^{-1} \tag{22}$$

where ⊗ is the Kronecker product of matrices. It should be noticed that the 2×2 dimensional identity matrix $I_{N_{pol}}$ is not the only choice, if some cross-polarization information can be obtained (e.g. by information reported from the terminal device), $I_{N_{pol}}$ in this equation can be replaced by another matrix which contains the cross-polarization information.

In HVEZF process, Kronecker structure may be introduced to calculate the Eigen channel matrix $E_k(s, t)$ for the device 120-k to further reduce the computational complexity. When adopting Kronecker structure, horizontal and vertical covariance matrices ($R_k^h(s, t)$ and $R_k^v(s, t)$) are calculated instead of calculating full-dimension covariance matrix $R_k(s, t)$. Based on the definitions above, horizontal covariance matrix can be calculated by:

$$R_k^h(s,t) = \frac{1}{N_{pol} N_{row} |\mathcal{F}_s|} \sum_{f \in \mathcal{F}_s} \sum_{p=1}^{N_{pol}} \sum_{r=1}^{N_{row}} (A_k^{r,p}(f,t))^T (A_k^{r,p}(f,t))^* \tag{23}$$

where $A_k^{r,p}(f, t) = H_k(f, t)[:, [1: N_{col}] + (r-1)N_{col} + (p-1)N_{col}N_{row}]$, $(\bullet)^T$ and $(\bullet)^*$ mean transpose and conjugate of a matrix separately.

Similarly, vertical covariance matrix can be calculated by:

$$R_k^v(s,t) = \frac{1}{N_{pol} N_{col} |\mathcal{F}_s|} \sum_{f \in \mathcal{F}_s} \sum_{p=1}^{N_{pol}} \sum_{c=1}^{N_{col}} (B_k^{c,p}(f,t))^T (B_k^{c,p}(f,t))^* \tag{24}$$

where $B_k^{c,p}(f, t) = H_k(f, t)[:, ([1: N_{row}]-1)N_{col} + c + (p-1)N_{col}N_{row}]$. It should be noticed that both polarizations utilize the same beamforming vectors in HVEZF, that's why horizontal and vertical covariance matrices are averaged across polarizations.

After obtaining the horizontal and vertical covariance matrices, the Eigen pairs of both covariance matrices can be calculated by EVD algorithms. For horizontal covariance matrix $R_k^h(s, t)$, denote its eigenvalues and eigenvectors as $\lambda_{k1}^h \geq \lambda_{k2}^h \geq \ldots$ and $v_{k1}^h, v_{k2}^h, \ldots$. And for vertical covariance matrix $R_k^v(s, t)$, denote its eigenvalues and eigenvectors as $\lambda_{k1}^v \geq \lambda_{k2}^v \geq \ldots$ and $v_{k1}^v, v_{k2}^v, \ldots$. Then the first eigenvector of $R_k^v(s, t) \otimes R_k^h(s, t)$ can be calculated by $v_{k1} = v_{k1}^v \otimes v_{k1}^h$, and the second eigenvector can be calculated by:

$$v_{k2} = \begin{cases} v_{k1}^v \otimes v_{k2}^h, & \text{for } \lambda_{k1}^v \lambda_{k2}^h \geq \lambda_{k2}^v \lambda_{k1}^h \\ v_{k2}^v \otimes v_{k1}^h, & \text{for } \lambda_{k1}^v \lambda_{k2}^h < \lambda_{k2}^v \lambda_{k1}^h \end{cases} \quad (25)$$

With these eigenvectors, the effective Eigen channel matrix of the device 120-$k$ can be obtained by $E_k(s, t) = (v_{k1}, \ldots, v_{kL/2})$ It should be noticed that the size of $E_k(s, t)$ is N/2 by L/2 due to adopting polarization averaging.

FIGS. 7A to 12B illustrate simulation performances of embodiments of the present disclosure and conventional technologies.

As shown in FIGS. 7A to 12B, embodiments of the present disclosure are compared with EBF, BD-ZF, max-SLNR and EZF schemes. The simulation parameters are listed as follows: modulation order: 16-QAM constellation; number of antennas at network device: N=32 (32 transmit antennas); number of co-scheduled terminal devices: K=8 or K=12 (each UE utilizes 1 to 2 beams for transmission); number of antennas at terminal device: $\overline{M}=2$ or $\overline{M}=4$ (2 or 4 receiving antennas); minimum-mean square error with interference rejection combining (MMSE-IRC) receiver is adopted In the simulation, the elements of $H_k$, i.e. channel matrix of kth terminal device, are assumed to be complex Gaussian variables with zero-mean and unit-variance. Furthermore, the additive noise vector $n_k$ is assumed to have independent complex Gaussian elements with zero-mean and variance $\sigma_k^2$. The received SNR $\rho_k$ are defined as $1/\sigma_k^2$.

Maximum orthogonality principle is used for MU pairing. 8 or 12 terminal devices with least correlations are selected as co-scheduled terminal devices from 16 candidate terminal devices to maximize the orthogonality between co-scheduled terminal devices. The results are averaged over 3,000 samples of terminal devices groups.

Figure 7A:
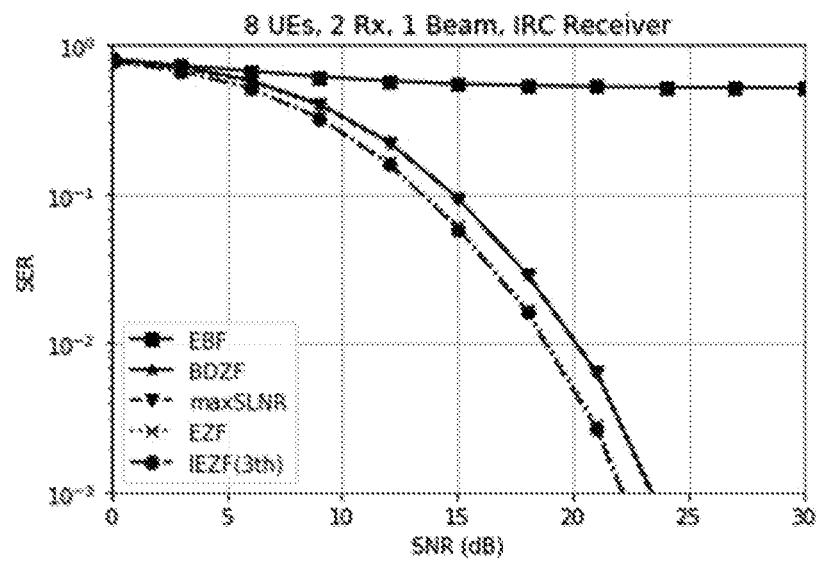
FIGS. 7A and 7B illustrate diagrams of performances according to embodiments of the present disclosure.
Figure 7B:
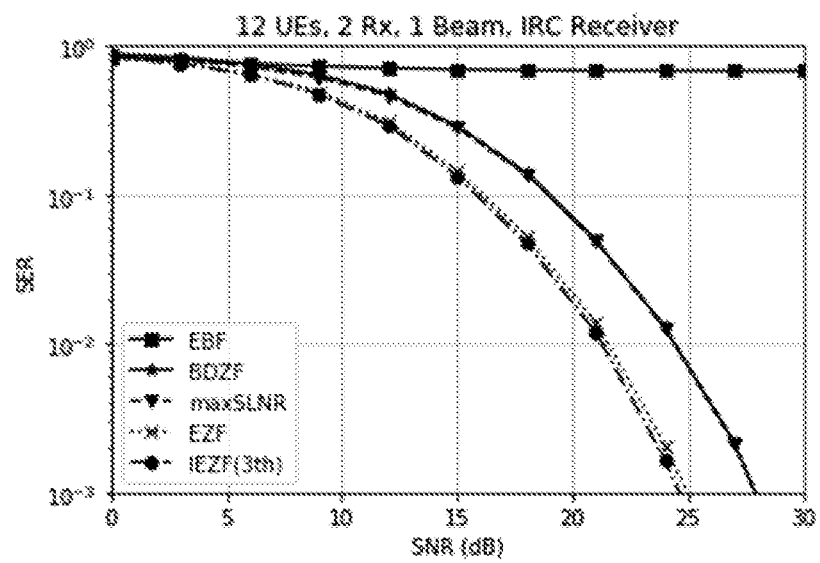

FIGS. 7A, 7B, 8A, 8B, 9A and 9B illustrate the simulation results in low-correlation cases. In this situation, the co-scheduled terminal devices have low correlations with each other. During the transmission, each terminal device utilizes 1 to 2 dominating beams for transmission, other beams are not used. The symbol error rate (SER) performances of different beamformers are shown in FIGS. 7A and 7B.

In FIGS. 7A and 7B, there are 8 or 12 co-scheduled terminal devices, each terminal device has 2 antennas and utilizes 1 dominating beam for data transmission. As shown in FIG. 7A, the case of 8 co-scheduled terminal devices, IEZF and EZF get the best performance, while BD-ZF and max-SLNR get the second-best performance. The selfish EBF gets the worst performance.

The case of 12 co-scheduled terminal devices is shown in FIG. 7B, IEZF gets the best performance, slightly better than EZF. The performance of max-SLNR is worse than EZF but slightly better than BD-ZF. EBF still gets the worst performance.

Figure 8A:
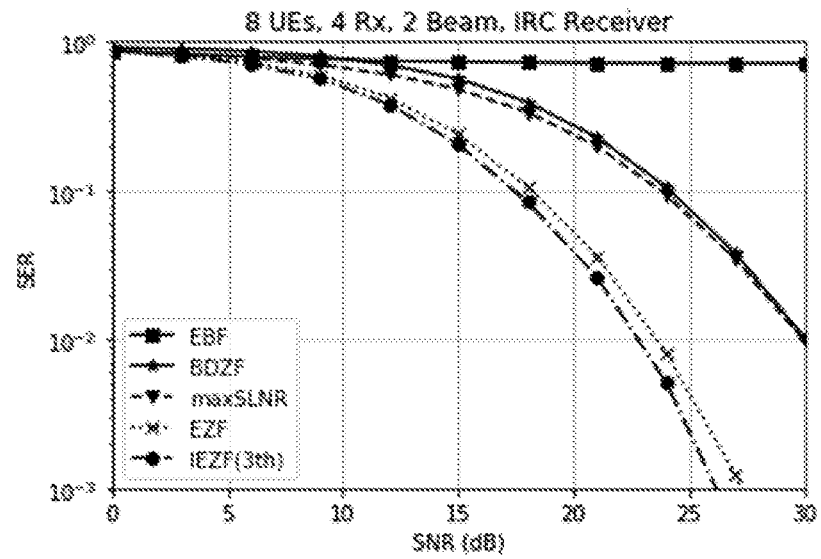
FIGS. 8A and 8B illustrate diagrams of performances according to embodiments of the present disclosure.
Figure 8B:
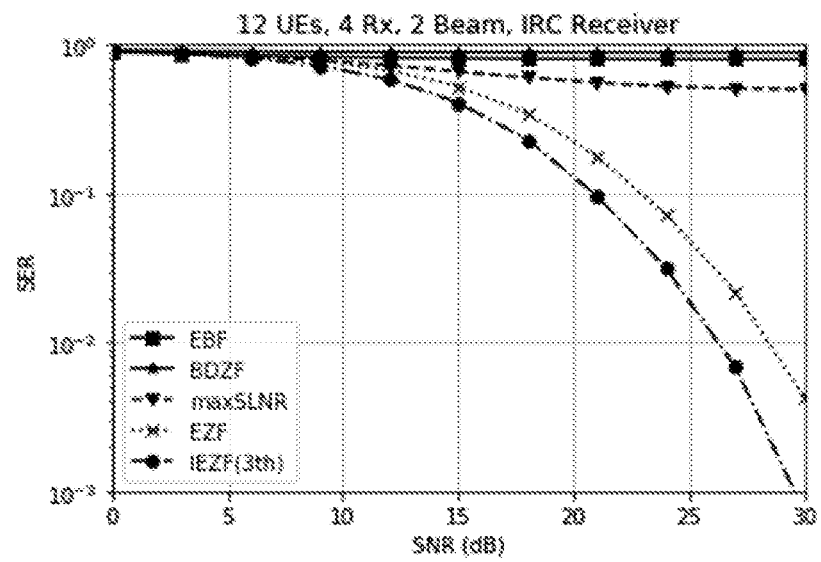

In FIGS. 8A and 8B, each terminal device has 4 antennas and utilizes 2 dominating beams for data transmission. The case of 8 co-scheduled terminal devices is shown in FIG. 8A, wherein IEZF still gets the best performance, and EZF gets the second-best performance. Max-SLNR gets the third-best performance, slightly better than BD-ZF. The selfish EBF still gets the worst performance.

The case of 12 co-scheduled terminal devices is shown in FIG. 8B, where IEZF still gets the best performance. EZF gets the second-best performance, and max-SLNR get the third-best performance. Due to dimension limitations, BD-ZF gets the worst performance, even worse than the SU-MIMO EBF.

Figure 9A:
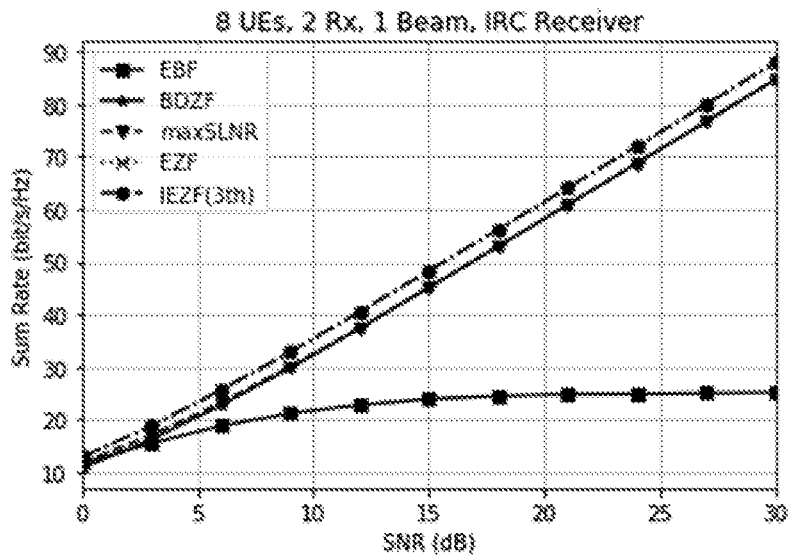
FIGS. 9A and 9B illustrate diagrams of performances according to embodiments of the present disclosure.
Figure 9B:
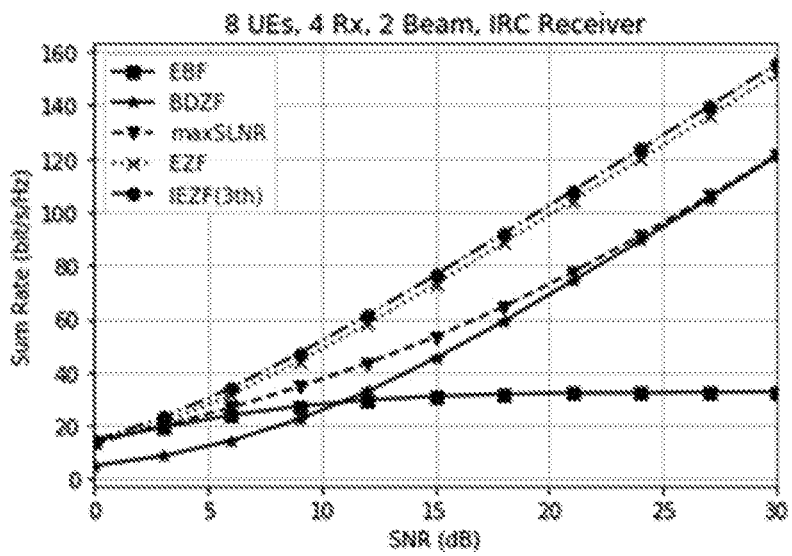

In FIGS. 9A and 9B, throughput performances of different beamforming methods are plotted based on MMSE-IRC receivers. As shown in FIG. 9A, each terminal device has 2 antennas and utilizes 1 dominating beam for data transmission. IEZF and EZF get the highest throughputs, while max-SLNR and BD-ZF get second-highest throughputs. EBF, the optimal beamformer in SU-MIMO cases, gets the lowest throughput.

As shown in FIG. 9B, each terminal device has 4 antennas and utilizes 2 dominating beams for data transmission, IEZF gets the highest throughput, EZF gets the second-highest throughput, and max-SLNR gets the third-highest throughput. BD-ZF gets lower throughputs than EBF at low SNRs but gets higher throughput than EBF at high SNRs. These results further verified the SER performances of different beamformers above.

FIGS. 10A, 10B, 11A, 11B, 12A and 12B illustrate the simulation results in high-correlation cases. In this situation, the co-scheduled terminal devices have high correlations with each other, which is an approximation for scenarios wherein terminal devices are located very closely. During the transmission, each terminal device utilizes 1 to 2 dominating beams for transmission, other beams are not used. The SER performances of different beamformers are shown in FIGS. 10A-11B.

Figure 10A:
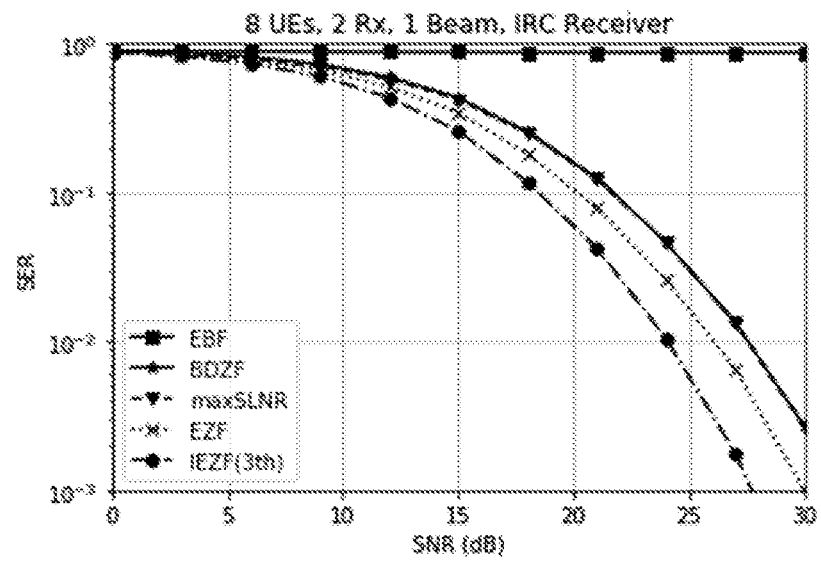
FIGS. 10A and 10B illustrate diagrams of performances according to embodiments of the present disclosure.
Figure 10B:
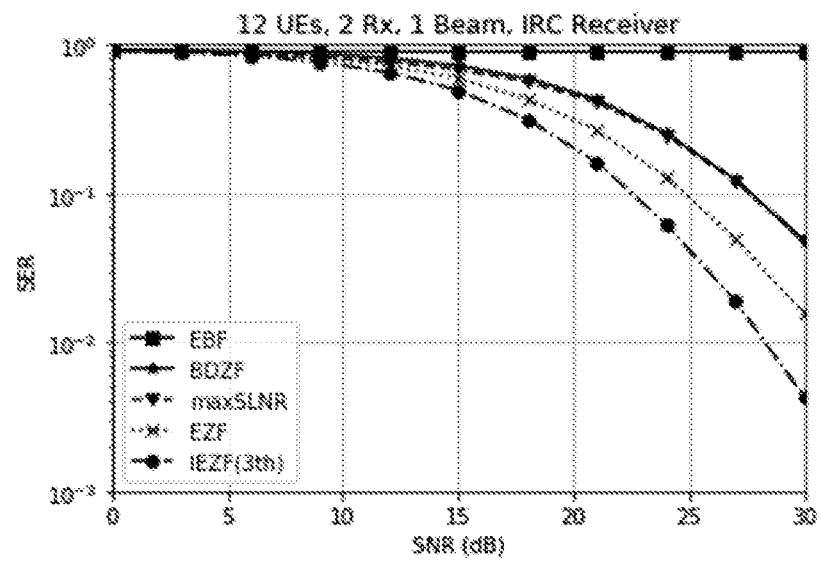

In FIGS. 10A and 10B, there are 8 or 12 co-scheduled terminal devices with high correlations, each terminal device has 2 antennas and utilizes 1 dominating beam for data transmission. The case of 8 co-scheduled terminal devices is shown in FIG. 10A where IEZF gets the best performance, much better than other beamformers' performances. EZF gets the second-best performance while max-SLNR and BD-ZF get the third-best performance. EBF, the optimal beamformer in SU-MIMO cases, gets the worst performance.

The case of 12 co-scheduled terminal devices is shown in FIG. 10B, where IEZF gets the best SER performance and EZF gets the second-best. Max-SLNR and BD-ZF get similar performances, worse than EZF but much better than EBF.

Figure 11A:
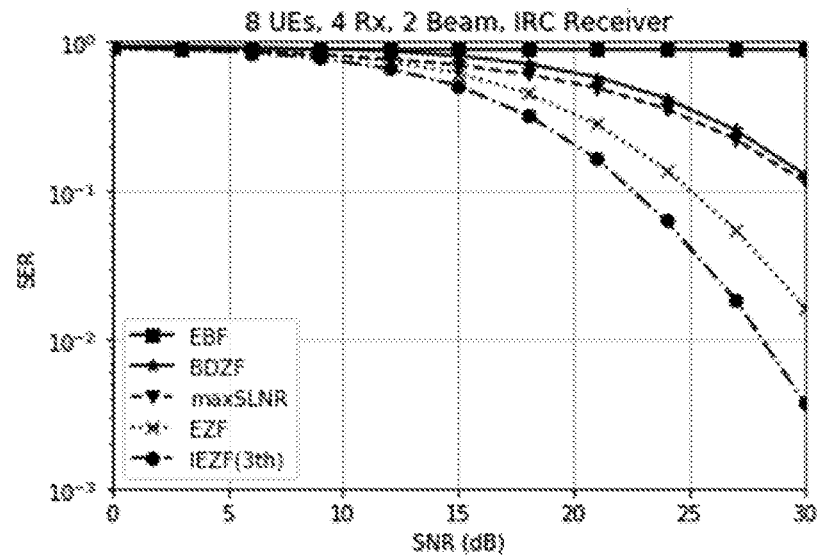
FIGS. 11A and 11B illustrate diagrams of performances according to embodiments of the present disclosure.
Figure 11B:
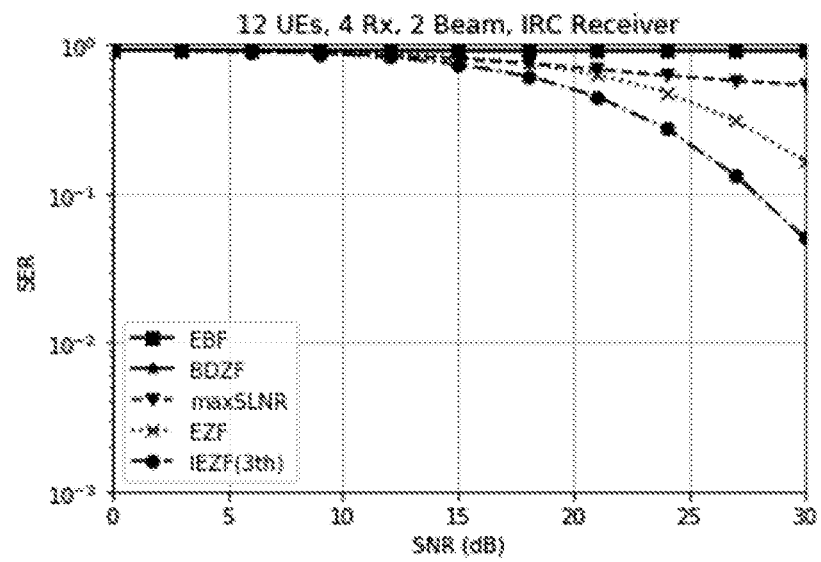

In FIGS. 11A and 11B, there are 8 or 12 co-scheduled terminal devices with high correlations, each terminal device has 4 antennas and utilizes 2 dominating beams for data transmission. The case of 8 co-scheduled terminal devices is shown in FIG. 11A where IEZF gets the best performance. EZF gets the second-best performance and max-SLNR gets the third-best performance. BD-ZF gets slightly worse performance than max-SLNR but much better than the SU-MIMO EBF beamformer.

The case of 12 co-scheduled terminal devices is shown in FIG. 11B where IEZF still gets the best SER performance. EZF gets the second-best and max-SLNR gets the third-best performance. Due to dimension limitations, BD-ZF fails to get a better performance than EBF, and both of them get the worst SER performances.

Figure 12A:
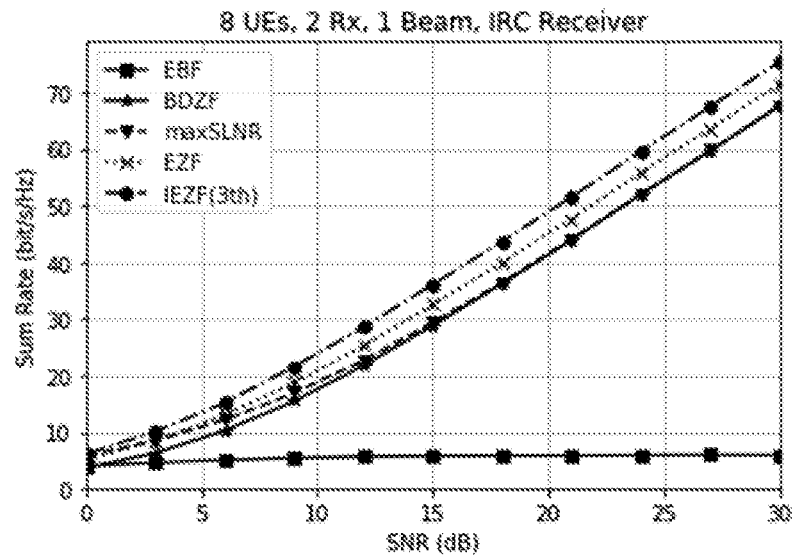
FIGS. 12A and 12B illustrate diagrams of performances according to embodiments of the present disclosure.
Figure 12B:
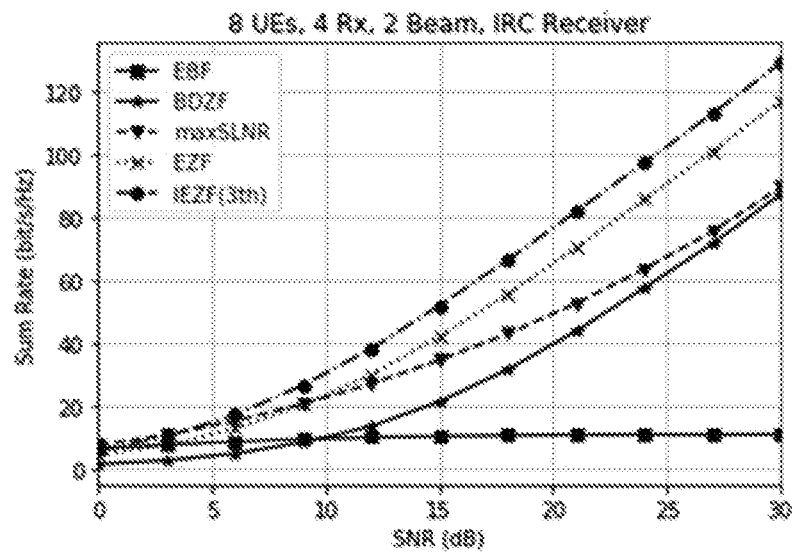

In FIGS. 12A and 12B, throughput performances of different beamforming methods are plotted based on MMSE-IRC receivers. As shown in FIG. 12A where each terminal device has 2 antennas and utilizes 1 dominating beam for transmission, IEZF gets the highest throughput and EZF gets the second highest. Max-SLNR gets the third-highest throughput, slightly better than BD-ZF, and EBF gets the lowest throughput.

As shown in FIG. 12B where each terminal device has 4 antennas and utilizes 2 dominating beams for transmission, IEZF gets the highest throughput, EZF gets the second-highest throughput, and max-SLNR gets the third-highest throughput. BD-ZF gets lower throughput than EBF at low SNRs but gets higher throughput than EBF at high SNRs.

In some embodiments, an apparatus for performing the method 300 (for example, the first device 110) may comprise respective means for performing the corresponding steps in the method 300. These means may be implemented in any suitable manners. For example, it can be implemented by circuitry or software modules.

In some embodiments, the apparatus comprises means for determining, at a first device, one or more beamforming vectors for one or more devices in a plurality of co-scheduled devices; means for iteratively updating the one or more beamforming vectors by determining transmission properties of channels between the first device and the plurality of co-scheduled devices based on the one or more beamforming vectors and channel estimations of the channels; performing precoding on the transmission properties of channels to mitigate interferences between the plurality of co-scheduled devices; and means for performing beamforming for the plurality of co-scheduled devices based on the iteratively updated one or more beamforming vectors.

In some embodiments, the means for determining the one or more beamforming vectors comprises: means for determining one or more eigenvectors of at least one covariance matrix of the plurality of co-scheduled devices.

In some embodiments, the means for determining the one or more eigenvectors for one device of the one or more devices in the plurality of co-scheduled devices comprises: means for determining a horizontal covariance matrix of the device; means for determining a vertical covariance matrix of the device; means for determining at least one eigenvector of the horizontal covariance matrix of the at least one device; and means for determining at least one eigenvector of the vertical covariance matrix.

In some embodiments, the apparatus comprises means for recovering the one or more beamforming vectors for the device based on the at least one eigenvector of the horizontal covariance matrix and the at least one eigenvector of the vertical covariance matrix.

In some embodiments, the means for updating the one or more beamforming vectors comprises: means for determining a regularization parameter based on signal-to-noise ratios of the plurality of co-scheduled devices; and means for performing the precoding on the transmission properties and the regularization parameter.

In some embodiments, the means for performing precoding on the transmission properties of channels comprises means for performing an interference cancelling operation on the one or more beamforming vectors to update the one or more beamforming vectors.

In some embodiments, the one or more beamforming vectors are iteratively updated until the number of the iteration reaches a threshold number.

In some embodiments, the one or more beamforming vectors are iteratively updated until the interference is below a threshold value.

In some embodiments, the apparatus further comprises means for in accordance with a determination that the number of the beamforming vectors for one device of the one or more devices exceeds one, orthogonalizing the updated one or more beamforming vectors of the device.

In some embodiments, the first device is a network device and the at least one device is a terminal device.

Figure 13:
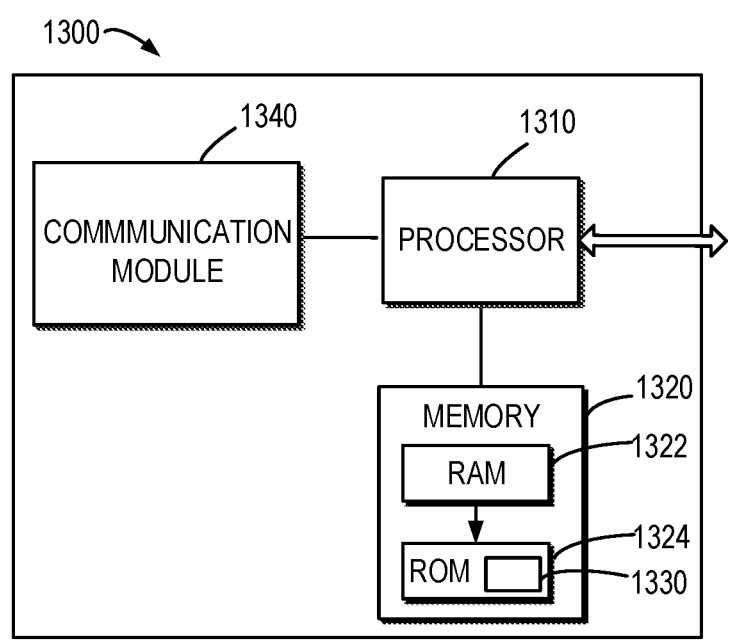
FIG. 13 illustrates a simplified block diagram of an apparatus that is suitable for implementing embodiments of the present disclosure.

FIG. 13 is a simplified block diagram of a device 1300 that is suitable for implementing embodiments of the present disclosure. The device 1300 may be provided to implement the communication device, for example the first device 110, the second device 120, or the vehicle as shown in FIG. 1. As shown, the device 1300 includes one or more processors 1310, one or more memories 1320 coupled to the processor 1310, and one or more communication modules 1340 coupled to the processor 1310.

The communication module 1340 is for bidirectional communications. The communication module 1340 has at least one antenna to facilitate communication. The communication interface may represent any interface that is necessary for communication with other network elements.

The processor 1310 may be of any type suitable to the local technical network and may include one or more of the following: general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

The memory 1320 may include one or more non-volatile memories and one or more volatile memories. Examples of the non-volatile memories include, but are not limited to, a Read Only Memory (ROM) 1324, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1322 and other volatile memories that will not last in the power-down duration.

A computer program 1330 includes computer executable instructions that are executed by the associated processor 1310. The program 1330 may be stored in the ROM 1324. The processor 1310 may perform any suitable actions and processing by loading the program 1330 into the RAM 1322.

Embodiments of the present disclosure may be implemented by means of the program 1320 so that the device 1300 may perform any process of the disclosure as discussed with reference to FIG. 3. Embodiments of the present disclosure may also be implemented by hardware or by a combination of software and hardware.

Figure 14:
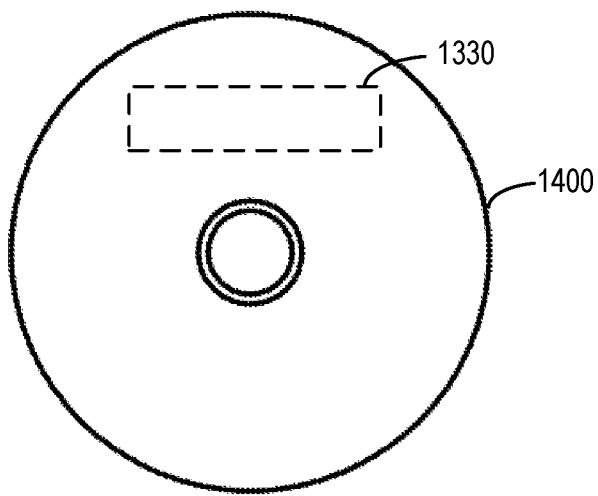
FIG. 14 illustrates a block diagram of an example computer readable medium in accordance with some example embodiments of the present disclosure.

In some example embodiments, the program 1330 may be tangibly contained in a computer readable medium which may be included in the device 1300 (such as in the memory 1320) or other storage devices that are accessible by the device 1300. The device 1300 may load the program 1330 from the computer readable medium to the RAM 1322 for execution. The computer readable medium may include any types of tangible non-volatile storage, such as ROM, EPROM, a flash memory, a hard disk, CD, DVD, and the like. FIG. 14 shows an example of the computer readable medium 1400 in form of CD or DVD. The computer readable medium has the program 1330 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labor between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 1300 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 1300 may be instead comprised in the distributed unit, and at least some of the described processes may be performed by the distributed unit.

In an embodiment, the execution of at least some of the functionalities of the device 1300 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 1300 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 as described above with reference to FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
    at least one processor; and
    at least one memory including computer program code;
    the at least one memory and the computer program code are configured to, with the at least one processor, cause the first device to:
    determine one or more beamforming vectors for one or more devices in a plurality of co-scheduled devices;
    iteratively update the one or more beamforming vectors by
        determining transmission properties of channels between the first device and the plurality of co-scheduled devices based on the one or more beamforming vectors and channel estimations of the channels; and
        performing precoding on the transmission properties of channels to mitigate interferences between the plurality of co-scheduled devices; and
    perform beamforming for the plurality of co-scheduled devices based on the iteratively updated one or more beamforming vectors.

2. The first device of claim 1, wherein the first device is caused to determine the one or more beamforming vectors by:
    determining one or more eigenvectors of at least one covariance matrix of the plurality of co-scheduled devices.

3. The first device of claim 2, wherein the first device is caused to determine the one or more eigenvectors for one device of the one or more devices by:
    determining a horizontal covariance matrix of the device;
    determining a vertical covariance matrix of the device;
    determining at least one eigenvector of the horizontal covariance matrix; and
    determining at least one eigenvector of the vertical covariance matrix,
    wherein the first device is further caused to recover the one or more beamforming vectors for the device based on the at least one eigenvector of the horizontal covariance matrix and the at least one eigenvector of the vertical covariance matrix.

4. The first device of claim 1, wherein the first device is caused to update the one or more beamforming vectors by:
    determining a regularization parameter based on signal-to-noise ratios of the plurality of co-scheduled devices; and
    performing the precoding on the transmission properties and the regularization parameter.

5. The first device of claim 1, wherein the first device is caused to perform precoding on the transmission properties of channels by:
    performing an interference cancelling operation on the one or more beamforming vectors to update the one or more beamforming vectors.

6. The first device of claim 1, wherein the one or more beamforming vectors are iteratively updated until the number of the iteration reaches a threshold number.

7. The first device of claim 1, wherein the one or more beamforming vectors are iteratively updated until the interference is below a threshold value.

8. The first device of claim 1, wherein the first device is further caused to:
    in accordance with a determination that the number of the beamforming vectors for one device of the one or more devices exceeds one, orthogonalize the updated one or more beamforming vectors of the device.

9. The first device of claim 1, wherein the first device is a network device and the at least one device is a terminal device.

10. A method for downlink beamforming in a multi-user multiple-input multiple-output (MU-MIMO) system comprising:
    determining, at a first device, one or more beamforming vectors for one or more devices in a plurality of co-scheduled devices;
    iteratively updating the one or more beamforming vectors by
        determining transmission properties of channels between the first device and the plurality of co-scheduled devices based on the one or more beamforming vectors and channel estimations of the channels; and
        performing precoding on the transmission properties of channels to mitigate interferences between the plurality of co-scheduled devices; and
    performing beamforming for the plurality of co-scheduled devices based on the iteratively updated one or more beamforming vectors.

11. The method of claim 10, wherein determining the one or more beamforming vectors comprises:
    determining one or more eigenvectors of at least one covariance matrix of the plurality of co-scheduled devices.

12. The method of claim 11, wherein determining the one or more eigenvectors for one device of the one or more devices comprises:
    determining a horizontal covariance matrix of the device;
    determining a vertical covariance matrix of the device;
    determining at least one eigenvector of the horizontal covariance matrix;
    determining at least one eigenvector of the vertical covariance matrix; and
    recovering the one or more beamforming vectors for the device based on the at least one eigenvector of the horizontal covariance matrix and the at least one eigenvector of the vertical covariance matrix.

13. The method of claim 10, wherein updating the one or more beamforming vectors comprises:
    determining a regularization parameter based on signal-to-noise ratios of the plurality of co-scheduled devices; and
    performing the precoding on the transmission properties and the regularization parameter.

14. The method of claim 10, wherein performing precoding on the transmission properties of channels comprises:
    performing an interference cancelling operation on the one or more beamforming vectors to update the one or more beamforming vectors.

15. The method of claim 10, wherein the one or more beamforming vectors are iteratively updated until the number of the iteration reaches a threshold number.

16. The method of claim 10, wherein the one or more beamforming vectors are iteratively updated until the interference is below a threshold value.

17. The method of claim 10, further comprising:
in accordance with a determination that the number of the beamforming vectors for one device of the one or more devices exceeds one, orthogonalizing the updated one or more beamforming vectors of the device.

18. The method of claim 10, wherein the first device comprises a network device and the at least one device comprises a terminal device.

19. A computer program embodied on a non-transitory computer-readable storage medium, said computer program comprising program instructions which, when executed by an apparatus, cause the apparatus to perform the method of claim 10.

* * * * *